US009015509B2

(12) United States Patent
Kim et al.

(10) Patent No.: US 9,015,509 B2
(45) Date of Patent: Apr. 21, 2015

(54) MECHANISM FOR LOW POWER STANDBY MODE CONTROL CIRCUIT

(75) Inventors: Gyudong Kim, Sunnyvale, CA (US); Eungu Kim, Palo Alto, CA (US); Min-Kyu Kim, Sunnyvale, CA (US); Daeyun Shim, Saratoga, CA (US); Ravi Sharma, Cupertino, CA (US); Myounghwan Kim, Cupertino, CA (US); Jaeryon Lee, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 462 days.

(21) Appl. No.: 13/362,930

(22) Filed: Jan. 31, 2012

(65) Prior Publication Data

US 2012/0204048 A1 Aug. 9, 2012

Related U.S. Application Data

(60) Provisional application No. 61/440,131, filed on Feb. 7, 2011.

(51) Int. Cl.
*G06F 1/32* (2006.01)

(52) U.S. Cl.
CPC ............ *G06F 1/3287* (2013.01); *G06F 1/3246* (2013.01); *G06F 1/3293* (2013.01)

(58) Field of Classification Search
CPC ............................ G06F 1/3287; G06F 9/4418
See application file for complete search history.

(56) References Cited

U.S. PATENT DOCUMENTS 5,961,647 A * 10/1999 Kim et al. .................... 713/300
6,131,167 A * 10/2000 Cruz ........................... 713/320
7,266,389 B2 * 9/2007 Karaoguz et al. .......... 455/556.1
2011/0062794 A1 * 3/2011 Vergoossen et al. .......... 307/125
2011/0296058 A1 * 12/2011 Cho et al. ....................... 710/14

* cited by examiner

*Primary Examiner* — Dennis M Butler
(74) *Attorney, Agent, or Firm* — Fenwick & West LLP

(57) ABSTRACT

Embodiments of the invention are generally directed to a low power standby mode control circuit. An embodiment of an apparatus includes a processor, an interface for a connection with a second apparatus, and an operational circuit, wherein the processor is to disable one or more power connections to the operational circuit in a standby mode. The apparatus further includes a standby mode control circuit, the standby control circuit to operate using a standby power source, wherein the standby mode control circuit is to detect a stimulus signal from the second apparatus and in response to the stimulus signal the standby control circuit is to signal the processor, the processor to enable the one or more power connections of the operational circuit.

17 Claims, 4 Drawing Sheets

MECHANISM FOR LOW POWER STANDBY MODE CONTROL CIRCUIT

RELATED APPLICATIONS

This application is related to and claims priority to U.S. Provisional Patent Application No. 61/440,131, filed Feb. 7, 2011, and such application is incorporated herein by reference.

TECHNICAL FIELD

Embodiments of the invention generally relate to the field of electronic devices, and, more particularly, to a mechanism for a low power standby mode control circuit.

BACKGROUND

In the operation of electronic devices, such as televisions and other consumer electronic devices, reduction in the consumption of power remains a high priority. Minimizing power consumption assists in extension of battery life in mobile operation, and reduction in the economic and environmental costs of power production when a device receives power from a power outlet.

Among the common tools for reducing power consumption is the transitioning of a device into standby mode or other lower power state when the device is not in active operation, where the device is placed in standby mode to assist in more quickly transitioning the device to active operation compared to a power off state. However, devices continue to consume power in standby modes. New regulations regarding television sets may require significant reductions in power consumption, and in particular address power consumption of television in standby mode.

Among other issue, electronic devices include transistor devices that consume a certain amount of leakage current when in a standby mode. A chip thus consumes leakage current through the transistor elements of the chip that are turned off even if the chip is set to a standby mode.

As a result, conventional electronic devices can continue to consume a significant amount of power while in standby modes, which becomes an increasingly greater issue as the density of devices increases and thus there are more transistors to consume leakage current and add to the standby power consumption of the device.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
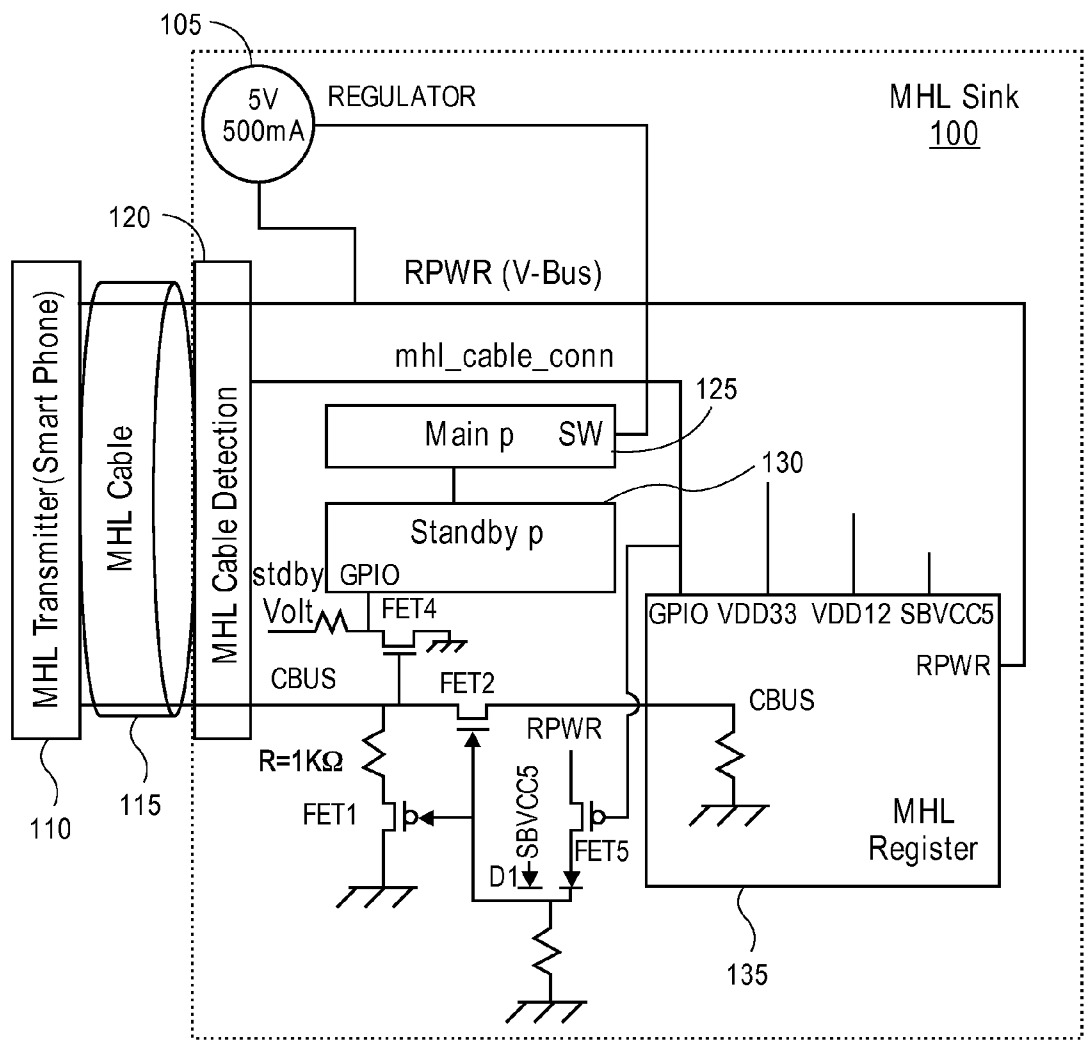
FIG. 1 is an illustration of an embodiment of a system including low power standby mode control.

Embodiments of the invention are generally directed to a mechanism for low power standby mode control circuit.

In a first aspect of the invention, an embodiment of an apparatus a processor; an interface for a connection with a second apparatus; and an operational circuit, wherein the processor is to disable one or more power connections to the operational circuit in a standby mode; and a standby mode control circuit. The standby control circuit is to operate using a standby power source, wherein the standby mode control circuit is to detect a stimulus signal from the second apparatus and in response to the stimulus signal the standby control circuit is to signal the processor, the processor to enable the one or more power connections of the operational circuit.

In a second aspect of the invention, a method includes transitioning an apparatus or system to a standby mode, disabling by a processor one or more power connections to an operational circuit, and operating a standby mode control circuit on a standby power source. The method further includes receiving a wake up signal from a second apparatus or system at the standby mode control circuit, and, in response to the wake up signal, generating a signal from the standby mode control circuit to the processor, the processor to enable the one more power connections in response to the signal from the standby mode control circuit.

DETAILED DESCRIPTION

Embodiments of the invention are generally directed to mechanism for a low power standby mode control circuit.

In some embodiments, an apparatus, system, or method provides for reduced leakage current consumption of devices by utilizing a low power standby mode control circuit to disabling normal power pin voltages while maintaining a low power supply voltage to allow triggering of normal operation.

In some embodiments, an apparatus or system is to minimize leakage of current consumption of a chip in a standby mode by introducing an additional power pin facilitating additional power through the additional pins while lowering power from other pins.

In some embodiments, an apparatus or system is to maintain a mobile receiver chip or other operational circuit in a power down state while in a sink standby mode; and facilitate a processor to turn the power on in the mobile receiver chip in a mobile sink to put the mobile receiver chip in an active power state, wherein the facilitating is performed in response to a wake-up call. In some embodiments, the mobile receiver chip is an MHL (Mobile High-Definition Link) compatible receiver chip.

In some embodiments, in order to minimize the leakage current consumption of a chip while the chip is on standby mode, an additional power pin, which may be referred to as a low power supply power pin (LPSBV), is adopted to allow powering down the other power pins of the chip. In an example, low power operation in a deep standby mode for MHL compatible sink devices is provided.

A computer chip consumes leakage current through transistors that are turned off even if the chip is set to the standby mode. In some embodiments, in order to reduce power consumption and satisfy certain requirements, such as the regulations of the California Energy Commission regarding maximum standby-passive mode power consumption, the leakage current consumed while a chip is in standby mode is reduced. In one embodiment, a low power consumption requirement (such as a consumption requirement for television sets) is addressed for an MHL sink when the MHL sink in standby mode.

In some embodiments, to reduce the current consumption at a standby mode of a chip, a single power pin (referred to as the LPSBV) is assigned as a power pin to facilitate a low power standby circuit. In some embodiments, in a standby mode, the LPSBV supplies the power to the chip, while other power pins are disabled and do not provide any power. In some embodiments, when a control bus (CBUS) transitions from low to high, serving as a stimulus to cause a chip to wake up from the standby mode, then the standby circuit detects the changing of the CBUS level and informs the processor or control element (referred to as MICOM) that the chip has detected the wake-up signal and then the MICOM provides the power to the chip for normal operation. In some embodiments, an apparatus or system may be implemented using field-effect transistors (FETs), resistors, diodes and a microprocessor.

FIG. 1 is an illustration of an embodiment of a system including low power standby mode control. In some embodiments, a sink device such as an MHL sink 100 is coupled via a cable, illustrated as MHL cable 115, with a source device (such as a smart phone) containing an MHL transmitter 110. In this illustration, the MHL sink 110 includes a cable detection element 120 to detect connection of a source device. Connections include RPWR (a voltage bus, or V-bus) and a control bus (CBUS), where RPWR is coupled with a voltage regulator 105 to provide a 5V, 500 mA regulated voltage source in this example.

In some embodiments, the regulated voltage is provided to a main microprocessor 125, while a standby mode microprocessor 130, coupled to the main microprocessor, receives a standby voltage, whereby the standby microprocessor may be a part of a standby mode control circuit. The MHL sink 100 includes an MHL receiver 135, which is coupled with RPWR and is coupled with a connection to CBUS via FET2, where a signal via FET5 alternatively switches FET2 on (providing CBUS to the MHL receiver 135) or switches FET1 on to provide a pulldown path to ground through resistor R. The CBUS provides a signal to switch FET4, to provide a path to ground for the standby voltage.

In some embodiments, power pins other than the low power standby pin, such as RPWR, SBVCC5 (5 volts), and MICOMVDD33 (3.3 volts), do not receive power in a standby mode. While an apparatus is in standby mode, the power connections are disabled such that regular power supply does not consume power, while the low power supply power pin is active to allow for triggering normal operation when a stimulus is received from outside of the chip. Thus, in the standby mode, only the low power supply power pin for a chip is consuming power, where the resulting current consumption may be significantly much lower than the static leakage current of MICOMVDD33.

As illustrated in FIG. 1, an operation includes:

(1) In the MHL sink's 100 standby mode, the MHL receiver chip 135 within the MHL sink is placed in power down condition (for example, a state where no power is supplied) and the MHL receiver chip 135 does not consume any power during this time.

(2) When an MHL cable 115 is connected to the MHL sink 100, and the MHL transmitter 110 contained in a smart phone or other device is required to put the MHL sink in an active power mode, the transmitter sends "wake-up" pulses on the MHL CBUS via the MHL cable to both the standby circuit or microprocessor 130 and the MHL receiver 135. However, embodiments are not limited to the illustrated wake-up pulses, and may include any received stimulus signal.

(3) Because the MHL receiver chip 135 is in the power down mode, the standby microprocessor 130 receives and detects the wake-up pulses on the MHL CBUS.

(4) If the standby microprocessor determines that the wake up pulses are valid, the standby microprocessor operates to enable the main microprocessor 125 in the MHL sink.

(5) The main microprocessor 125 in the MHL sink 100 turns on power for the MHL receiver chip 135 within the MHL sink.

(6) The previous process (5) puts the MHL sink 100 in an active power state, and then normal MHL connectivity is established between the MHL transmitter 110 contained in the smart phone or other computing device and the MHL receiver 135 within the MHL sink 100 via MHL signals.

Figure 2:
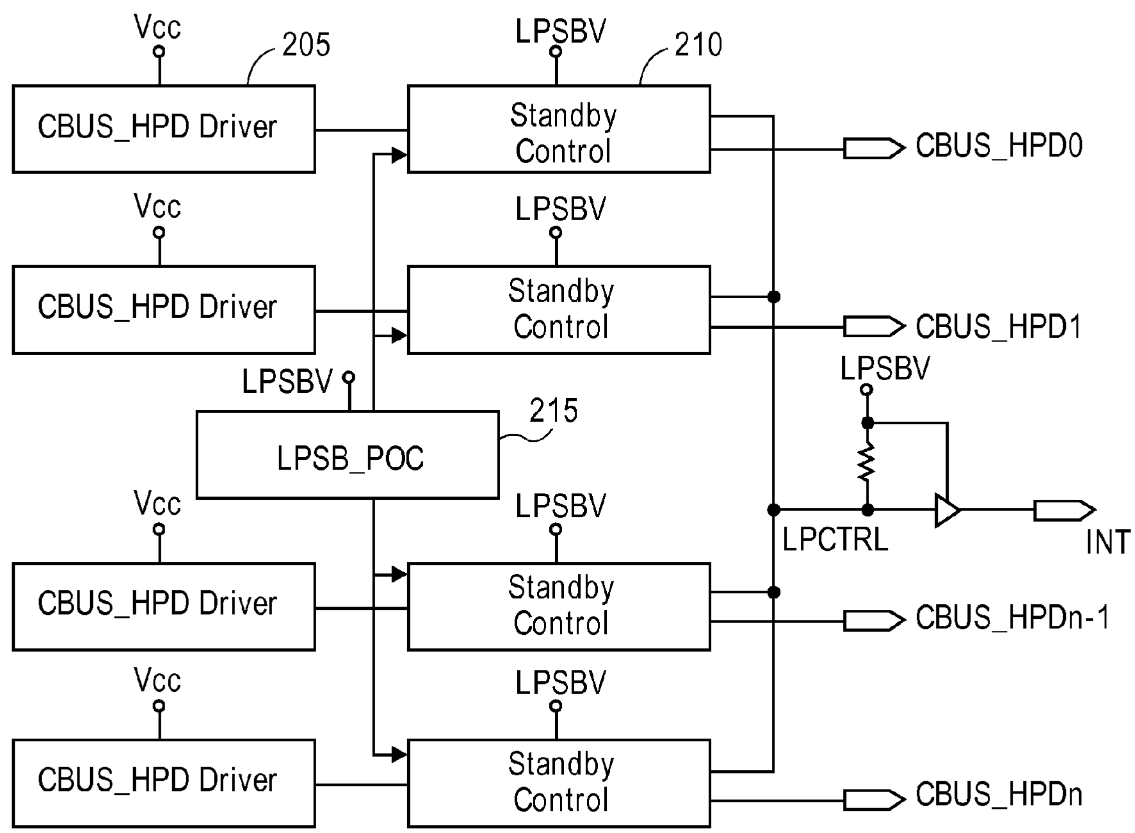
FIG. 2 is an illustration of elements of an embodiment of an apparatus or system providing low power standby mode control.
Figure 3:
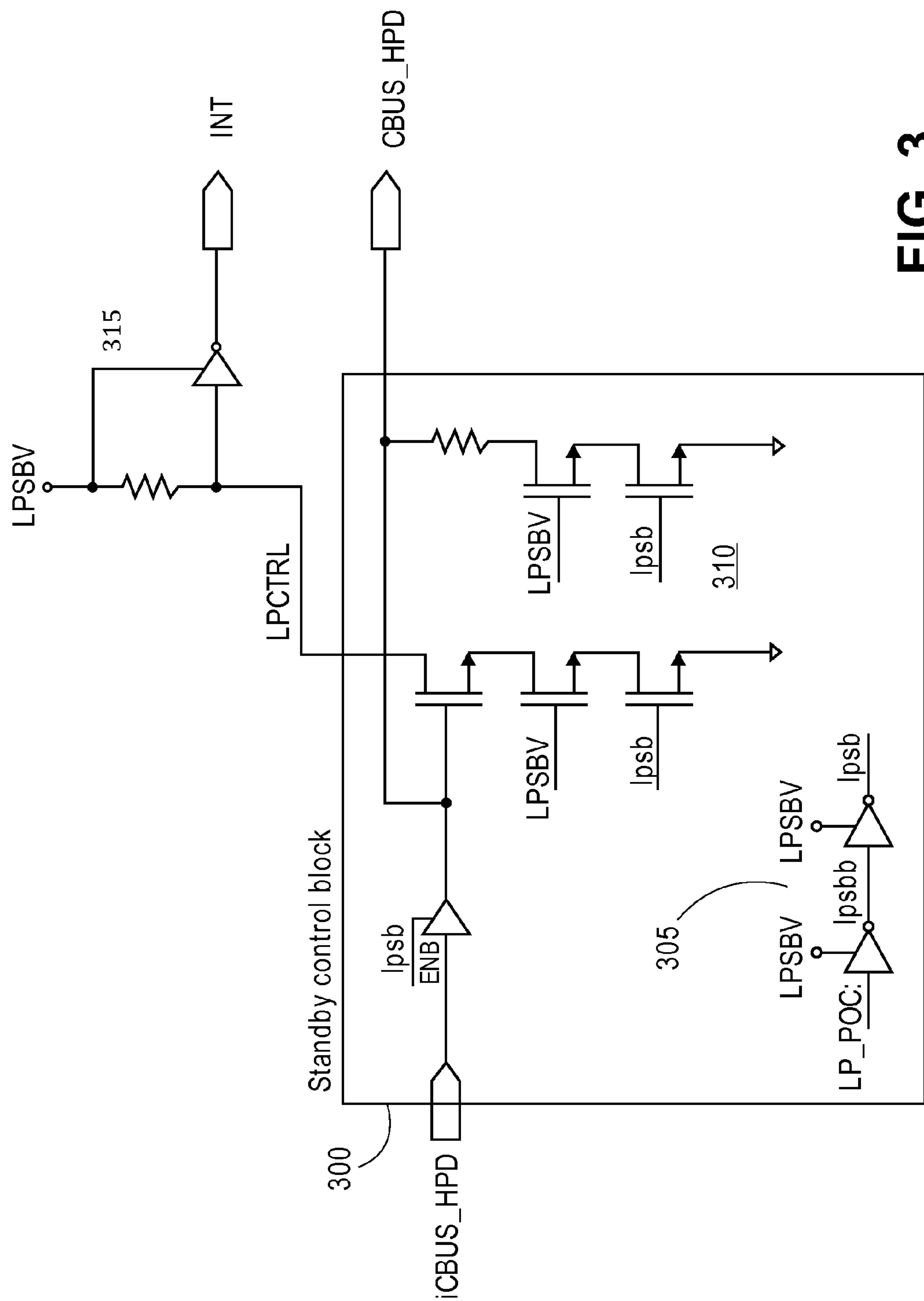
FIG. 3 illustrates an embodiment of a standby control block of an apparatus or system.

FIGS. 2 and 3 illustrate the operation of low power standby mode. FIG. 2 is an illustration of elements of an embodiment of an apparatus or system providing low power standby mode control. In this illustration, an apparatus or system includes a plurality of driver elements 205, illustrated as a number n of CBUS_HPD Drivers, receiving voltage Vcc, each driver being coupled with a standby control 210 receiving voltage LPCBV. In some embodiments, each standby control element 210 is coupled with LPSB_POC 215 (powered by the LPSBV), each standby control including a connection to a pad for a stimulus signal, CBUS_HPD (shown as CBUS_HPD0 through CBUS_HPDn), and each being connected to a low power control (LPCRTL) line.

FIG. 3 illustrates an embodiment of a standby control block of an apparatus or system. The standby control block 300 includes a sub-block 305 to receive an LP_POC signal and generate an lpsb (low power standby) signal via two inverter elements. In this illustration, a standby control block 300 receives iCBUS_HPD and produces the stimulus signal CBUS_HPD, wherein a circuit branch 310 is coupled with a resistance, a first transistor (FET) receiving LPSBV at a gate, and a second FET receiving lpsb at a gate. The standby control block 300 provides LPCNTRL (low power control).

In some embodiments, a process includes:

(1) A chip enters a standby mode, and thus Vcc transitions to 0 V, and LPSBV is 3.3 V;

(2) There is a wait in the standby mode until a stimulus signal is received at the CBUS_HPD pad (see FIGS. 2 and 3), with operations:

(a) LP_POC goes high, and then LPSB goes high, and (b) CBUS_HPD is low, causing LPCTRL to go high and INT to go low (circuit 315);

(3) When CBUS_HPD transitions to high from low:

(a) LPCTRL becomes low, then INT goes high from low, (b) MICOM on the system board detects this signal, and provides a command to generate the normal power on at the chip, and (c) RPWR, SBVCC5, Vcc transition to normal operational values and LP_POC becomes low; and (4) As shown in FIG. 2, because LPCTRL is a wired OR circuit for all the ports, if one of ports detects the wake-up stimulus signal from standby mode, the chip commences the wake-up procedure.

As used herein, "network" or "communication network" mean an interconnection network to deliver digital media content (including music, audio/video, gaming, photos, and others) between devices. A network may include a personal entertainment network, such as a network in a household, a network in a business setting, or any other network of devices and/or components. In a network, certain network devices may be a source of media content, such as a digital television tuner, cable set-top box, video storage server, and other source device. Other devices may display or use media content, such as a digital television, home theater system, audio system, gaming system, or presented over the Internet in a browser, and other devices. Further, certain devices may be intended to store or transfer media content, such as video and audio storage servers. Certain devices may perform multiple media functions. In some embodiments, the network devices may be co-located in a single local area network. In other embodiments, the network devices may span multiple network segments, such as through tunneling between local area networks. The network may include multiple data encoding and encryption processes.

Figure 4:
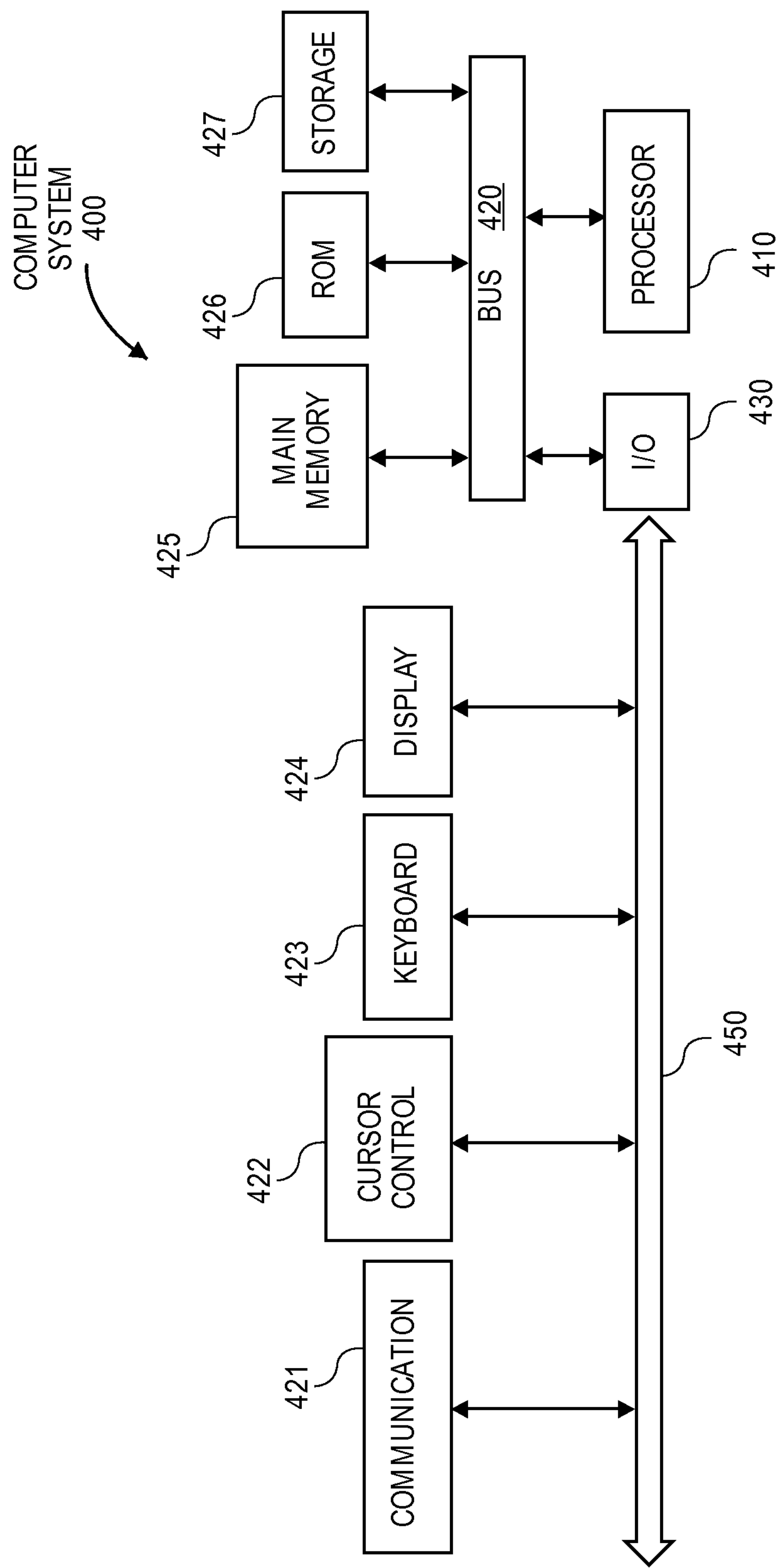
FIG. 4 illustrates a device or computer system on which embodiments of the present invention may be implemented.

FIG. 4 illustrates a device or computer system 400 on which embodiments of the present invention may be implemented. In some embodiments, the device or computer system 400 includes a low power standby mode control circuit, such as illustrated in FIGS. 1-3, the standby control circuit to provide for reduced power consumption in standby mode. Device or computer system 400 includes a system bus 420 for communicating information, and a processor 410 coupled to bus 420 for processing information. According to one embodiment, processor 410 is implemented using one of the multitudes of microprocessors. Nevertheless, one of ordinary skill in the art will appreciate that other processors may be used.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 427 such as a magnetic disk or optical disc and its corresponding drive may also be coupled to computer system 400 for storing information and instructions. Computer system 400 can also be coupled to a second input/output (I/O) bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients) via external data network. The communication device 421 may comprise a modem, a network interface card, or other well-known interface device, such as those used for coupling to Ethernet, token ring, or other types of networks. Computer system 400 includes, but is not limited to, a network computer device, a mobile telephone, a personal data assistant (PDA), etc.

Computer system 400 may be interconnected in a client/server network system. A network may include a Local Area Network (LAN), Wide Area Network (WAN), Metropolitan Area Network (MAN), intranet, the Internet, etc. Any number of network devices can be cascaded into being connected with a port multiplier forming a networking mechanism within a network. It is contemplated that there may be any number of devices connected via the network. A device may transfer data streams, such as streaming media data, to other devices in the network system via a number of standard and non-standard protocols, including the protocols described in this document.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a non-transitory computer-readable storage medium having content to provide instructions, data, etc. The content may result in an electronic device, for example, a filer, a disk, or a disk controller as described herein, performing various operations or executions described.

Portions of various embodiments of the present invention may be provided as a computer program product, which may include a non-transitory computer-readable storage medium having stored thereon computer program instructions, which may be used to program a computer (or other electronic devices) to perform a process according to the embodiments of the present invention. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
- a processor;
- an interface for a cable connection with a second apparatus;
- a detection element to detect the cable connection with the second apparatus at the interface;
- an operational circuit, wherein the processor is to disable one or more power connections to the operational circuit in a standby mode; and
- a standby mode control circuit, the standby mode control circuit to operate using a standby power source, wherein the standby mode control circuit is to detect a stimulus signal from the second apparatus and in response to the stimulus signal the standby mode control circuit is to signal the processor, the processor to enable the one or more power connections of the operational circuit,
- wherein the stimulus signal is received from the second apparatus via a control bus (CBUS) in connection with the detection element detecting the cable connection with the second apparatus, the CBUS coupled to the operational circuit.

2. The apparatus of claim 1, wherein the operational circuit is a receiver chip.

3. The apparatus of claim 1, wherein the apparatus is a Mobile High-Definition Link (MHL) compatible device.

4. The apparatus of claim 1, wherein the operational circuit includes a plurality of transistor element, the transistor elements being disabled when the one or more power connections are disabled.

5. The apparatus of claim 1, wherein the operational circuit is to be placed in a power down state in the standby mode.

6. The apparatus of claim 1, further comprising a first switch to couple the CBUS with the operational circuit and to turn on in response to the detection element detecting the cable connection with the second apparatus.

7. The apparatus of claim 1, wherein the stimulus signal is a voltage level change on the CBUS.

8. A method comprising:
- transitioning an apparatus or system to a standby mode;
- disabling by a processor one or more power connections to an operational circuit;
- operating a standby mode control circuit on a standby power source;
- detecting by a detection element a cable connection with a second apparatus or system;
- receiving a stimulus signal from the second apparatus or system at the standby mode control circuit; and
- in response to the stimulus signal, generating a signal from the standby mode control circuit to the processor, the processor to enable the one more power connections in response to the signal from the standby mode control circuit,
- wherein the stimulus signal is received from the second apparatus or system via a control bus (CBUS) in connection with the detection element detecting the cable connection with the second apparatus or system, the CBUS coupled to the operational circuit.

9. The method of claim 8, wherein disabling the one or more power connections places the operational circuit in a power off mode.

10. The method of claim 8, further comprising reducing leakage current consumption of the apparatus or system by disabling a plurality of transistors of the operational circuit in the standby mode.

11. The method of claim 8, wherein the operational circuit is a receiver chip.

12. The method of claim 8, wherein the apparatus or system is a Mobile High-Definition Link (MHL) compatible apparatus or system.

13. A non-transitory computer-readable storage medium having stored thereon data representing sequences of instructions that, when executed by a processor, cause the processor to perform operations comprising:
- transitioning an apparatus or system to a standby mode;
- disabling by a processor one or more power connections to an operational circuit;
- operating a standby mode control circuit on a standby power source;
- detecting by a detection element a cable connection with a second apparatus or system;
- receiving a stimulus signal from the second apparatus or system at the standby mode control circuit; and
- in response to the stimulus signal, generating a signal from the standby mode control circuit to the processor, the processor to enable the one more power connections in response to the signal from the standby mode control circuit,
- wherein the stimulus signal is received the second apparatus or system via a control bus (CBUS) in connection with the detection element detecting the cable connection with the second apparatus or system, the CBUS coupled to the operational circuit.

14. The medium of claim 13, wherein disabling the one or more power connections places the operational circuit in a power off mode.

15. The medium of claim 13, further comprising instructions that, when executed by the processor, cause the processor to perform operations comprising:
- reducing leakage current consumption of the apparatus or system by disabling a plurality of transistors of the operational circuit in the standby mode.

16. The medium of claim 13, wherein the operational circuit is a receiver chip.

17. The medium of claim 13, wherein the apparatus or system is a Mobile High-Definition Link (MHL) compatible apparatus or system.

* * * * *